United States Patent [19]

Workman

[11] 4,219,342
[45] Aug. 26, 1980

[54] POLLUTION CONTROL SYSTEM

[76] Inventor: Carl J. Workman, 240 E. 1100 North, North Salt Lake, Utah 84054

[21] Appl. No.: 28,474

[22] Filed: Apr. 9, 1979

[51] Int. Cl.³ .............................................. B01D 47/06
[52] U.S. Cl. ........................................ 55/222; 55/228;
261/3; 261/118; 261/152
[58] Field of Search ......................... 55/222, 226, 228; 261/3, 118, 155, 152, 156, DIG. 9, DIG. 11, DIG. 77, 109

[56] References Cited

U.S. PATENT DOCUMENTS

| | | | |
|---|---|---|---|
| 2,006,109 | 6/1935 | Morse | 55/222 |
| 2,280,633 | 4/1942 | Crawford | 261/3 X |
| 2,858,903 | 11/1958 | Goetz et al. | 55/228 X |
| 3,385,197 | 5/1968 | Greber | 261/109 X |
| 3,731,461 | 5/1973 | Hamon | 55/222 |
| 3,800,505 | 4/1974 | Tarves, Jr. | 55/222 X |
| 3,958,961 | 5/1976 | Bakke | 55/228 X |
| 3,965,672 | 6/1976 | Stephens | 261/DIG. 77 |

FOREIGN PATENT DOCUMENTS 525702  9/1940  United Kingdom ............ 261/DIG. 77

*Primary Examiner*—Richard L. Chiesa
*Attorney, Agent, or Firm*—H. Ross Workman; J. Winslow Young; Rick D. Nydegger

[57] ABSTRACT

A pollution control system including a smokestack placed at a substantially elevated location on adjacent mountainous terrain and a tunnel interconnecting the smokestack with a source of airborne pollutants. A water-operated scrubber is placed in a part of the tunnel to remove some of the pollutants from the gaseous effluent stream. A heater and a blower increase the upward velocity of the residual effluent stream to assist in impelling it out of the top of the smokestack for dispersal into the atmosphere.

15 Claims, 2 Drawing Figures

POLLUTION CONTROL SYSTEM

BACKGROUND OF THE INVENTION

This invention relates to a pollution control system and, more particularly, to a pollution control system and method whereby a gaseous effluent stream is scrubbed to recover some of the airborne pollutants and the residual exhaust gases are conveyed to a smokestack located on adjacent mountainous terrain with at least part of the distance of conveyance being through a tunnel.

THE PRIOR ART

The gaseous effluent from various industrial processes such as coal-fired generating systems, smelters, garbage incinerators, and the like, contains particulate and gaseous pollutants. Recent changes in legislation dealing with gaseous emissions have resulted from an increased awareness of the dangers inherent in the levels of pollutants in the atmosphere. More and more, this legislation is requiring an emphasis on removing as many of the pollutants as possible from the gaseous effluent prior to dispersing the remaining pollutants to the atmosphere.

Examples of prior art patents dealing with the removal of pollutants from a gaseous effluent stream are: U.S. Pat. No. 3,841,063; U.S. Pat. No. 3,728,094; U.S. Pat. No. 3,715,871; U.S. Pat. No. 3,548,761; U.S. Pat. No. 3,320,906; U.S. Pat. No. 2,785,879; U.S. Pat. No. 2,677,439; and U.S. Pat. No. 3,640,054.

While each of the foregoing references disclose processes and apparatus useful for removing many of the particulate and water-soluble pollutants from an exhaust gas stream, the remaining exhaust gas stream nevertheless still contains residual amounts of pollutants and/or toxic gases which must be suitably dispersed in the atmosphere.

Atmospheric dispersal of the remaining exhaust gases requires that the exhaust gases be expelled from a vertical smokestack with sufficient upward velocity and at a sufficient height to provide suitable dispersion into the atmosphere. Particularly for those industries of high pollution potential, such as smelters, refineries, power plants, solid waste burning sites, and the like, the smokestack must be of tremendous height in order to provide the appropriate dispersal of the airborne pollutants to comply with ground level emission standards. However, it is well known that extremely tall smokestacks are difficult and expensive to build and maintain.

The problem of atmospheric dispersal is intensified for smelters or other heavy industries typically located in or around mountainous regions. The mountains will in many instances prevent effective dispersal because the gaseous pollution stream is typically expelled at a height well below the mountains' summit. Thus, pollution will often times be entrapped in the valleys between such mountainous terrain.

In view of the foregoing, it would be an advancement in the art to provide a novel pollution control system wherein particulate matter and water-soluble pollutants are not only removed from an exhaust gas stream, but wherein the remaining exhaust gases are thereafter directed to a relatively short smokestack substantially elevated on mountainous terrain above the pollution source for improved dispersal of any residual pollutants, thereby realizing a substantial savings in costs of construction and maintenance. Such an apparatus and method are disclosed and claimed herein.

BRIEF SUMMARY AND OBJECTS OF THE INVENTION

The present invention relates to a novel apparatus and method for removing pollutants from a gaseous exhaust stream and for thereafter dispersing the residual gaseous pollutants at a substantially increased elevation so as to achieve improved atmospheric dispersal of the same. The invention includes scrubbing the exhaust gas stream to remove particulate and water-soluble pollutants therefrom and heating the residual exhaust gas stream for improving the upward loft of the exhaust gases. A blower is included for the purpose of mechanically impelling the exhaust gases upwardly toward the smokestack. Advantageously, the present invention includes mounting the smokestack on a mountain or similar elevated terrain and directing the pollutants through a tunnel to the smokestack.

It is, therefore, a primary object of this invention to provide improvements in pollution control systems.

Another object of this invention is to provide an improved method for dispersing airborne pollutants.

Another object of this invention is to provide a novel apparatus whereby a smokestack is placed at an elevated location on adjacent terrain with the gaseous pollutants being directed to the smokestack through a tunnel.

Another object of this invention is to provide an improved pollution control system whereby scrubbers are included in the tunnel thereby simplifying construction and maintenance costs.

These and other objects and features of the present invention will become more fully apparent from the following description and appended claims taken in conjunction with the accompanying drawing.

DETAILED DESCRIPTION OF THE PREFERRED EMBODIMENTS

Figures 1, 2:
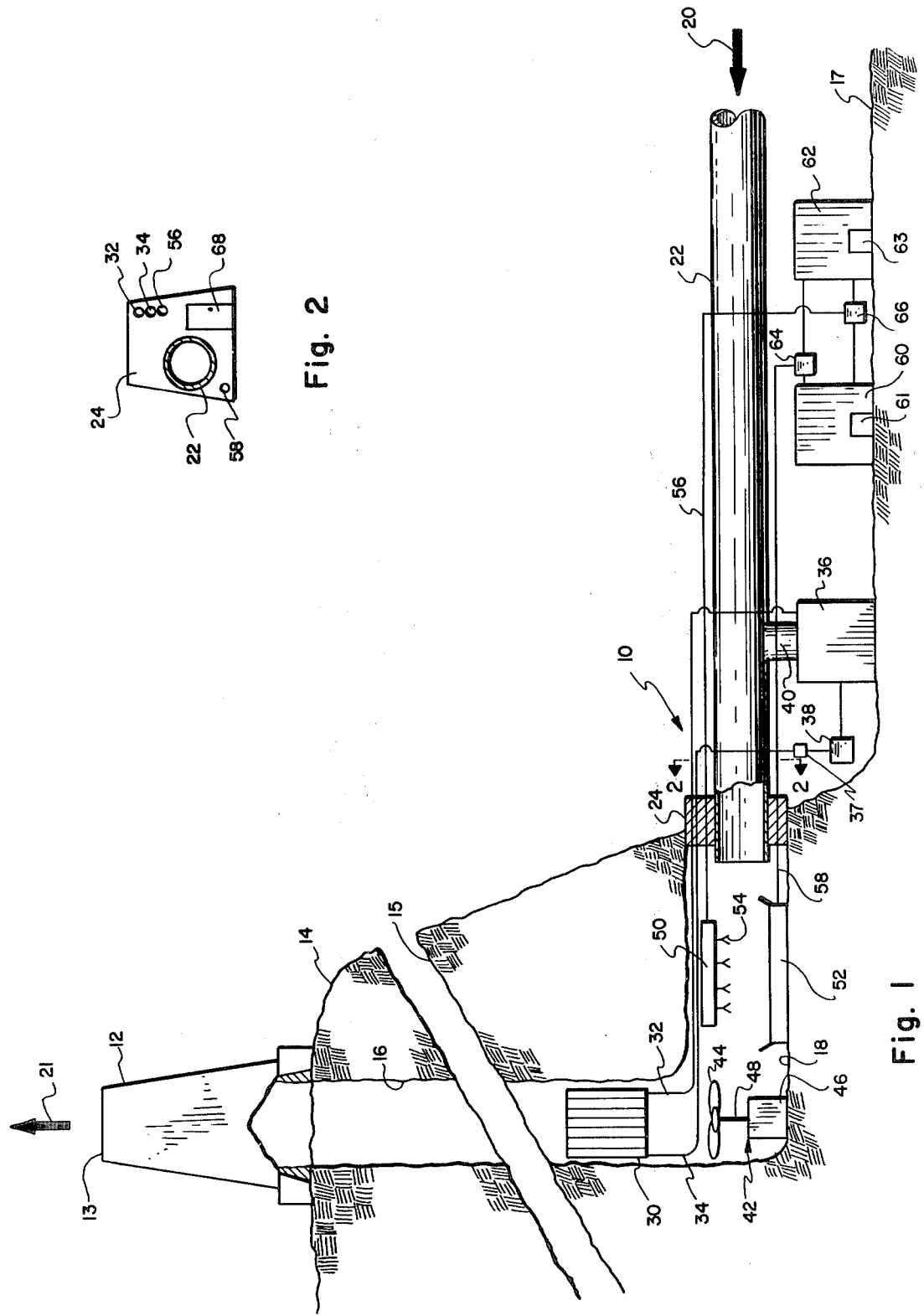
FIG. 1 is a schematic illustration of a presently preferred embodiment of this invention with portions broken away and shown in cross section for ease of illustration.
FIG. 2 is a cross section along lines 2—2 of FIG. 1.

The invention is best understood by reference to the drawing wherein like parts are designated with like numerals throughout.

Referring now more particularly to FIG. 1, the novel pollution control apparatus of this invention is shown generally at 10 and includes a short smokestack 12 located on the mountain 14 having a substantially higher elevation than the source (not shown) of gaseous pollutants 20. It should be noted that mountain 14 is schematically illustrated and shown broken at 15 to emphasize that mountain 14 extends several hundred or even thousands of feet above ground level 17. Mountain 14 thereby provides a base of extended elevation so that outlet 13 of smokestack 12 may be substantially higher above ground level 17 than if a smokestack were built at ground level 17. Accordingly, smokestack 12 may be relatively short and thus relatively inexpensive to construct.

Smokestack 12 is placed over the upper end of a vertical shaft 16 which is a continuum of a tunnel 18. Since both vertical shaft 16 and tunnel 18 are formed in mountain 14 the need to construct an extremely tall smokestack is eliminated.

A conduit 22 carries gaseous pollutants 20 from the pollution source (not shown) and interfaces with tunnel 18 at a facing 24 (see also FIG. 2) formed over the outlet to tunnel 18 in mountain 14.

A steam heater 30 is located adjacent the lower end of vertical shaft 16 and is interconnected with an incoming steam line 32 and a condensates line 34. Heater 30 is provided for the purpose of heating the upwardly traveling residual gaseous stream, thereby increasing the upward lift or loft of the gaseous stream through vertical shaft 16. Steam is supplied to inlet steam line 32 from a boiler 36 while condensate produced in heater 30 passes into condensate line 34 and collects in a condensate reservoir 38. The condensate is directed back into boiler 36 by suitable valves, pumps, and the like (not shown), where it is again converted into steam for steam line 32.

Relatively all of the condensate formed in heater 30 is returned through condensate trap 37 to condensate reservoir 38 so that the system formed between heater 30 and boiler 36 is essentially a closed system with very little requirement for makeup feed. Advantageously, it should be noted that the gaseous effluent generated by boiler 36 is directed also into conduit 22 by a boiler smokestack 40.

The novel pollution control system of this invention includes a blower apparatus 42 consisting of a fan-like impeller 44 mounted to a motor 46 by a shaft 48. Blower 42 further improves the draw of gaseous effluent through tunnel 18 and vertical shaft 16.

A washer 50 provides rotation spray of water from an inlet water line 56. As the gaseous effluent stream (indicated by arrow 20) passes below washer 50, water is sprayed from nozzles 54. The water spray scrubs much of the particulate and water-soluble pollutants from the effluent gas stream 20. The pollutants removed by the water spray are collected in catchment basin 52. Thereafter, the water with the entrapped pollutants is directed through an outlet line 58 into a settling system consisting of a first settling tank 60 and a second settling tank 62.

The dual settling tank system of this invention allows one tank to be settling and to be cleaned while the other tank is used to provide water through inlet line 56 to washer 50. To accomplish the foregoing, incoming pollutant-containing water from outlet line 58 is directed by a 3-way valve 64 into the appropriate settling tank 60 or 62. Thereafter, the clarified water is withdrawn through a second 3-way valve 66 into inlet line 56 where the water is returned to washer 50. Cleanouts 61 and 63 in settling tanks 60 and 62, respectively, are provided for allowing the operating personnel to periodically remove the collected sediments in tanks 60 and 62.

Referring now more particularly to FIG. 2, the tunnel facing 24 is shown for ease of illustration of the relationship of conduit 22 with tunnel 18. Tunnel facing 24 provides an airtight enclosure to the entrance of tunnel 18 so as to prevent the escape of pollutants from the tunnel's entrance. Also shown are the steam line 32, condensate line 34, inlet water line 56, and waste water line 58 in their relationship with conduit 22 and passing through facing 24. Additionally, facing 24 includes a door 68 to provide a manway into tunnel 18 for the purpose of allowing personnel to enter tunnel 18 for equipment repair, maintenance, replacement, inspection, cleaning, or the like.

In particular, it should be noted that the pollution control system of the present invention is highly advantageous since most or all of the pollution removal equipment (i.e. washer 50, blower 42, heater 30, etc.) may be easily accessed in the horizontal tunnel 18 through manway 68. This greatly simplifies maintenance and repair procedures.

Moreoever, the method and apparatus of this invention are particularly useful for smelter systems such as found in copper refineries, and the like. In particular, many smelter systems are located in or around mountainous terrain. Accordingly, it is feasible to place a relatively small, inexpensive smokestack 12 on the top of an adjacent mountain 14 and interconnect the smelter (not shown) with the smokestack 12 through vertical shaft 16, tunnel 18 and conduit 22.

As a further advantage, the surrounding rock structure of tunnel 18 and vertical shaft 16 is usually relatively impervious to any corrosive action by pollutants in gaseous effluent stream 20 thereby substantially minimizing any maintenance costs that would otherwise be incurred. The surrounding wall structure of mountain 14 around vertical shaft 16 and tunnel 18 is of a relatively constant temperature thereby substantially minimizing the inherent dangers of condensation of corrosive pollutants during cold weather operation.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A pollution control system for a pollution source located in proximity to mountainous terrain, said system comprising:
   a smokestack erected on top of said mountainous terrain at a substantially higher elevation than said pollution source;
   tunnel means connecting to the bottom end of said smokestack through at least a portion of said mountainous terrain; and
   conduit means connecting said tunnel means to said pollution source so as to direct a gaseous pollution stream from the pollution source through the tunnel means to the smokestack; and
   washer means located in a portion of said tunnel means for scrubbing pollutants from said gaseous pollution stream passing through said tunnel means.

2. The pollution control system defined in claim 1 wherein the tunnel means further comprise means for increasing the upward velocity of the pollution stream toward the smokestack.

3. The pollution control system defined in claim 2 wherein said means for increasing velocity comprise a blower means.

4. The pollution control system defined in claim 3 wherein the means for increasing upward velocity further comprise a heating means.

5. The pollution control system defined in claim 4 wherein said blower means and said heating means are located in at least a portion of said tunnel means.

6. The pollution control system defined in claim 1 further comprising facing means for the entrance of said tunnel means, said facing means receiving said conduit means in sealing relationship so as to prevent said gaseous pollution stream from escaping from the entrance to said tunnel means.

7. A pollution control system for a pollution source located adjacent to a mountainous terrain, the system comprising:
   a smokestack located at a substantially elevated position on top of the adjacent mountainous terrain;
   tunnel means connecting to the bottom end of said smokestack through at least a portion of said mountainous terrain;
   conduit means interconnecting the pollution source to said tunnel means;
   washer means located in a portion of said tunnel means for scrubbing pollutants from the gaseous pollution stream passing through the tunnel means;
   means for impelling the remaining gaseous pollution stream through the tunnel means to the smokestack; and
   facing means for the entrance of said tunnel means, said facing means receiving said conduit means in sealing relationship so as to prevent said gaseous pollution stream from escaping from the entrance to said tunnel means.

8. The pollution control system defined in claim 7 wherein said means for impelling said pollution stream comprise a heater, the heater heating the gaseous pollution stream thereby lowering the density of the pollution stream.

9. The pollution control system defined in claim 8 wherein heat energy for the heater is supplied by steam from a boiler, the boiler exhaust being diverted directly into the conduit means.

10. The pollution control system as defined in claim 8 wherein said impelling means further comprise a blower.

11. The pollution control system defined in claim 7 wherein at least a portion of said tunnel means are essentially horizontally situated.

12. The pollution control system as defined in claim 11 wherein said washer means are located in said horizontal portion of said tunnel means.

13. The pollution control system as defined in claim 11 wherein said impelling means are located in said horizontal portion of said tunnel means.

14. The pollution control system as defined in claim 7 wherein said washer means comprise:
   a washer having a plurality of spray nozzles;
   an inlet water line attached to said washer;
   a basin disposed beneath said washer so as to catch the water sprayed therefrom;
   a waste water line attached to said basin;
   two settling tanks connected through a first three-way valve to said waste water line; and
   a second three-way valve connecting said inlet water line to said settling tanks.

15. A pollution control system for a pollution source located in proximity to mountainous terrain, said system comprising:
   a smokestack erected on top of said mountainous terrain at a substantially higher elevation than said pollution source;
   a tunnel formed through at least a portion of said mountainous terrain, said tunnel connecting at one end thereof to the bottom end of said smokestack, at least a portion of said tunnel having an essentially horizontal orientation;
   a conduit connected at one end to the entrance of said tunnel and connected at the other end to said pollution source so as to direct a gaseous pollution stream from said pollution source through said conduit to said tunnel;
   facing means disposed at the entrance of said tunnel, said facing means receiving said conduit in sealing relationship so as to prevent said gaseous pollution stream from escaping from the entrance to said tunnel;
   a washer situated in the horizontal portion of said tunnel, the washer having a plurality of spray nozzles;
   an inlet water line attached to said washer;
   a basin disposed beneath said washer so as to catch the water sprayed therefrom;
   a waste water line attached to said basin;
   two settling tanks connected through a first three-way valve to said waste water line;
   a second three-way valve connecting said inlet water line to said settling tanks;
   a blower situated in the horizontal portion of said tunnel, said blower improving the flow of said gaseous pollution stream through said tunnel; and
   a heater situated in said tunnel, said heater further improving the flow of said gaseous pollution stream through said tunnel.

* * * * *